(12) United States Patent
Nanjappan et al.

(10) Patent No.: US 12,157,657 B2
(45) Date of Patent: Dec. 3, 2024

(54) EMERGENCY STOP SYSTEM FOR ELEVATOR

(71) Applicant: Otis Elevator Company, Farmington, CT (US)

(72) Inventors: Ezhil Nanjappan, Farmington, CT (US); Andrew S. Bierer, West Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1406 days.

(21) Appl. No.: 16/699,019

(22) Filed: Nov. 28, 2019

(65) Prior Publication Data

US 2021/0163260 A1 Jun. 3, 2021

(51) Int. Cl.
| | |
|---|---|
| *B66B 5/00* | (2006.01) |
| *B66B 1/28* | (2006.01) |
| *B66B 1/34* | (2006.01) |
| *B66B 5/02* | (2006.01) |
| *H04W 4/029* | (2018.01) |

(52) U.S. Cl.
CPC .............. *B66B 5/0056* (2013.01); *B66B 1/28* (2013.01); *B66B 1/3461* (2013.01); *B66B 5/025* (2013.01); *H04W 4/029* (2018.02)

(58) Field of Classification Search
CPC ........... B66B 5/0031; B66B 5/00; B66B 1/32; B66B 1/3461; B66B 3/00; B66B 5/0025; B66B 5/0087; B66B 1/3446; B66B 5/0018; B66B 1/3492; B66B 3/002; B66B 5/005; B66B 25/006
See application file for complete search history.

(56) References Cited

U.S. PATENT DOCUMENTS

| | | | |
|---|---|---|---|
| 6,202,797 B1* | 3/2001 | Skolnick ................. | B66B 5/005 187/391 |
| 6,467,585 B1 | 10/2002 | Gozzo et al. | |
| 6,550,585 B2 | 4/2003 | Schoppa et al. | |
| 7,258,202 B1 | 8/2007 | Rossignol | |
| 7,954,606 B2* | 6/2011 | Tinone .................... | B66B 5/005 187/391 |
| 8,261,885 B2 | 9/2012 | Ketoviita et al. | |
| 9,272,878 B2 | 3/2016 | Kocher et al. | |

(Continued)

FOREIGN PATENT DOCUMENTS

| | | | | |
|---|---|---|---|---|
| CN | 1371859 A | | 10/2002 | |
| CN | 103764532 A | * | 4/2014 | ............. B66B 5/005 |

(Continued)

OTHER PUBLICATIONS

US 10,124,988 B2, 11/2018, Tokura (withdrawn)

(Continued)

*Primary Examiner* — Marlon T Fletcher
(74) *Attorney, Agent, or Firm* — CANTOR COLBURN LLP

(57) ABSTRACT

Disclosed is an elevator system having: a holding relay configured to energize and deenergize a circuit, the holding relay configured to communicate over a wireless network with a mobile device, wherein the holding relay is configured to: deenergize the circuit responsive to receiving a first signal via the wireless network from the mobile device, indicative of the mobile device being in or near a first architectural location.

4 Claims, 3 Drawing Sheets

(56) References Cited

U.S. PATENT DOCUMENTS

| | | | |
|---|---|---|---|
| 9,403,663 B2 | 8/2016 | Dellarippa et al. | |
| 9,944,492 B2 | 4/2018 | Lustenberger | |
| 10,112,802 B2 * | 10/2018 | Dube | B66B 5/005 |
| 10,118,798 B2 | 11/2018 | Kattainen | |
| 10,183,837 B2 * | 1/2019 | Kusserow | B66B 1/3461 |
| 2002/0117358 A1 * | 8/2002 | Schoppa | B66B 13/24 187/391 |
| 2012/0031707 A1 | 2/2012 | Ketoviita et al. | |
| 2018/0186602 A1 | 7/2018 | Herkel et al. | |
| 2019/0062109 A1 * | 2/2019 | Nanjappan | B66B 5/005 |
| 2019/0202662 A1 | 7/2019 | Kattainen et al. | |
| 2019/0300336 A1 * | 10/2019 | Witczak | B66B 1/468 |

FOREIGN PATENT DOCUMENTS

| | | | | |
|---|---|---|---|---|
| CN | 108275522 A * | 7/2018 | | B66B 1/06 |
| CN | 108792873 A * | 11/2018 | | B66B 1/3446 |
| CN | 111071876 A * | 4/2020 | | B66B 1/3461 |
| CN | 112850402 A * | 5/2021 | | B66B 1/28 |
| EP | 3187449 A1 | 7/2017 | | |
| EP | 3348506 A1 * | 7/2018 | | B66B 1/3423 |
| EP | 3348507 A1 * | 7/2018 | | B66B 1/3461 |
| EP | 3483105 A1 | 5/2019 | | |
| EP | 3828115 A1 * | 6/2021 | | B66B 1/28 |
| JP | H02169482 A | 6/1990 | | |
| JP | 2011162275 A | 8/2011 | | |
| JP | 2014198609 A | 10/2014 | | |
| JP | 6247888 B2 | 12/2017 | | |
| WO | 201495511 A1 | 12/2012 | | |
| WO | WO-2013055346 A1 * | 4/2013 | | B66B 1/3461 |

OTHER PUBLICATIONS

European Search Report Issued in European Application No. 20210484. 0-1017 dated Apr. 7, 2021; 7 Pages.

Chinese Office Action; Issued: Mar. 2, 2022; Application No. 202011363094.0; Filed: Nov. 27, 2020; 7 pages.

* cited by examiner

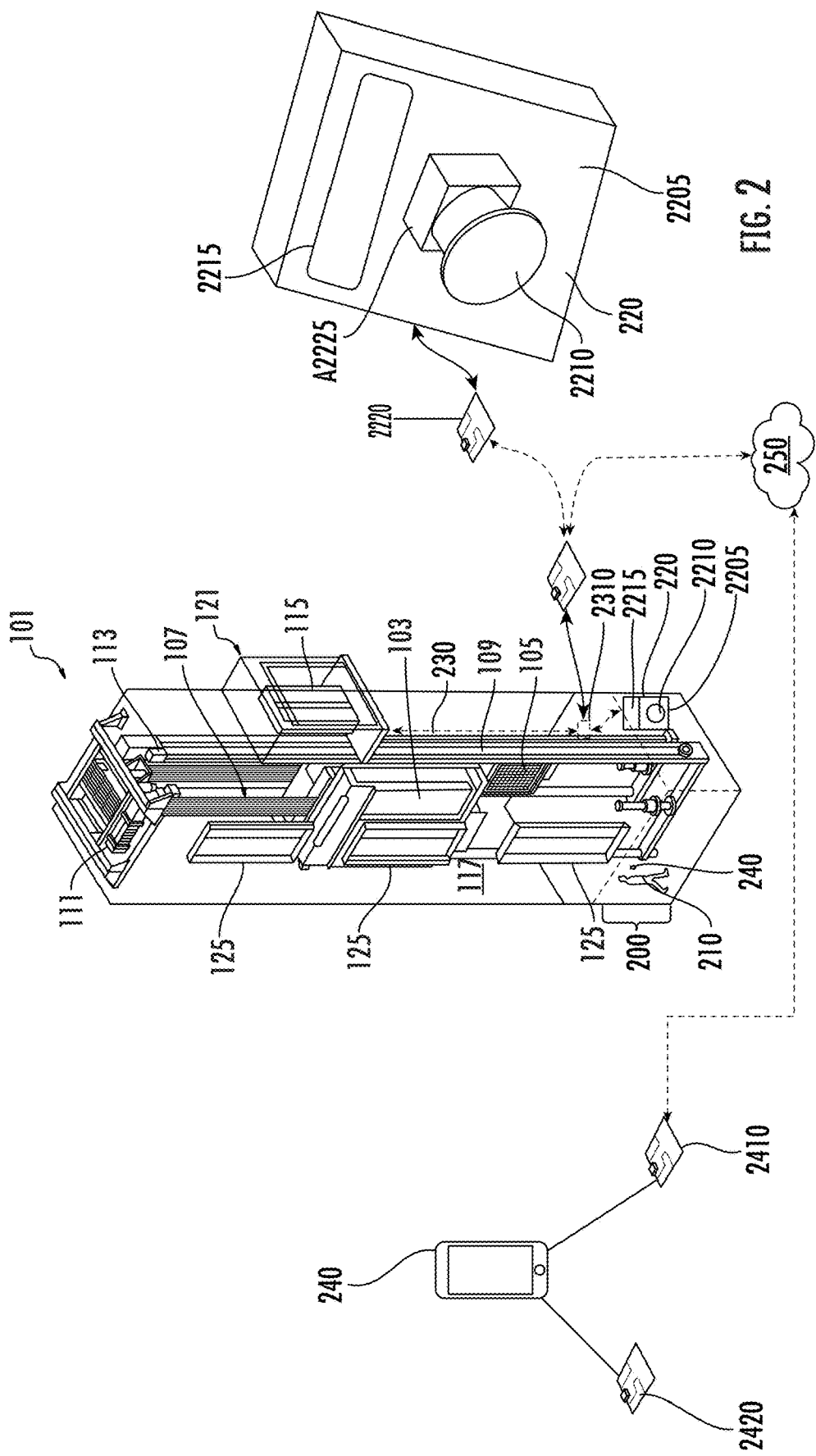

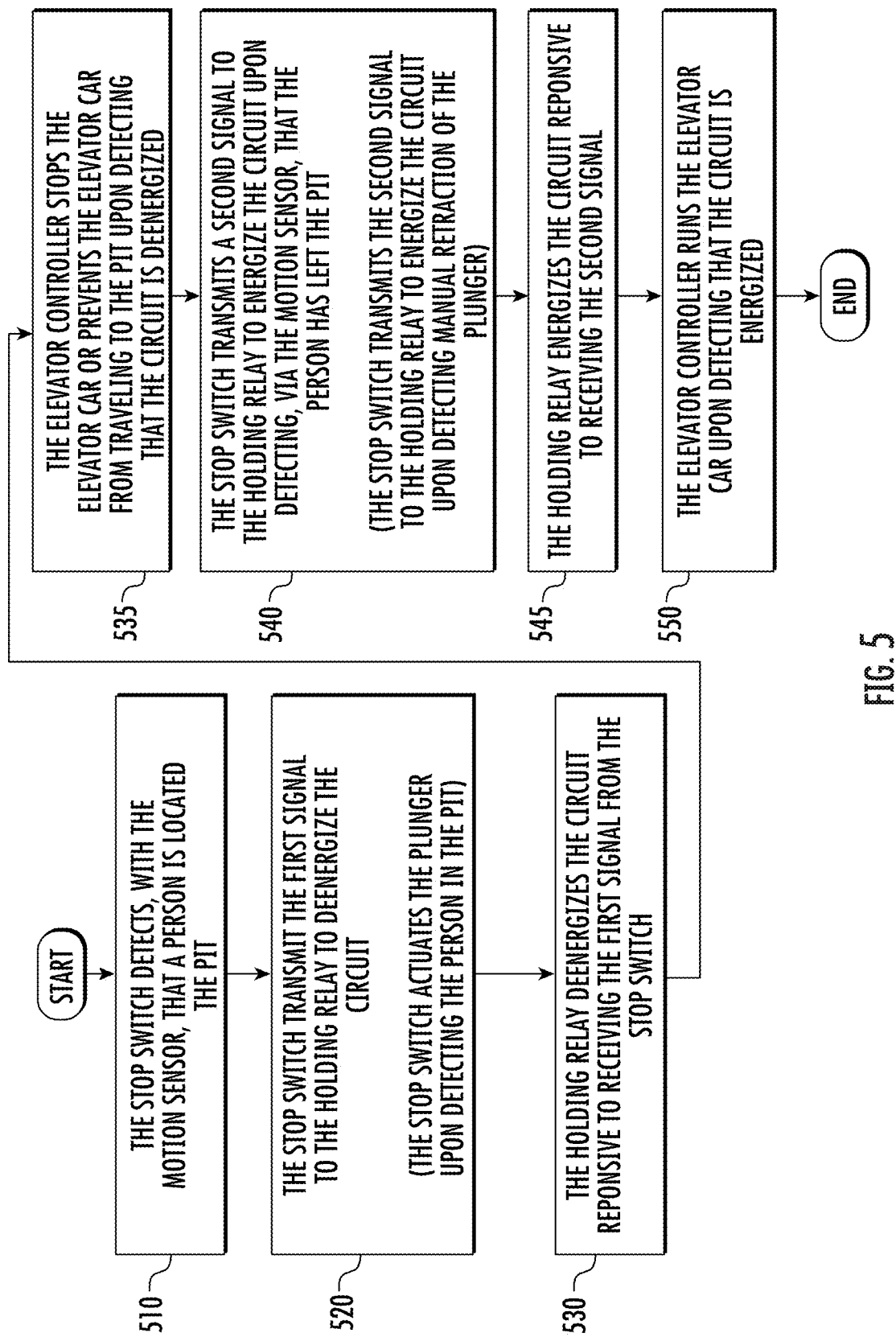

EMERGENCY STOP SYSTEM FOR ELEVATOR

BACKGROUND

The embodiments herein relate to elevator systems and more specifically to a system and method for an emergency stop system for an elevator.

Within an elevator pit, i.e., in an elevator hoistway, there may be a circumstance where a person such as a field technician needs access. This circumstance may pose a risk to such persons if an elevator car is allowed to run in the hoistway.

BRIEF SUMMARY

Disclosed is an elevator system having: a holding relay configured to energize and deenergize a circuit, the holding relay configured to communicate over a wireless network with a mobile device, wherein the holding relay is configured to: deenergize the circuit responsive to receiving a first signal via the wireless network from the mobile device, indicative of the mobile device being in or near a first architectural location.

In addition to one or more of the above disclosed features, or as an alternate, the first architectural location is in or near a hoistway pit.

In addition to one or more of the above disclosed features, or as an alternate, the holding relay is further configured to: energize the circuit responsive to receiving a second signal from the mobile device when the mobile device has left the first architectural location.

In addition to one or more of the above disclosed features, or as an alternate, the elevator system includes: an elevator controller operationally connected to the circuit and configured to: stop an elevator car or prevent the elevator car from traveling to the first architectural location upon detecting that the circuit is deenergized; and run the elevator car upon detecting that the circuit is energized.

In addition to one or more of the above disclosed features, or as an alternate, the elevator system includes: a hoistway, wherein: the elevator controller is in a controller room of the hoistway; the first architectural location is a hoistway pit of the hoistway; and the elevator car is positioned to move within the hoistway.

Further disclosed is an elevator system having: a stop switch that includes a motion sensor; wherein the stop switch is configured to: deenergize a circuit upon detecting, with the motion sensor, that a person is located within a first architectural location, to thereby stop an elevator from traveling to the first architectural location; energize the circuit upon detecting, with the motion sensor, that a person is no longer located within the first architectural location.

In addition to one or more of the above disclosed features, or as an alternate: the stop switch configured to communicate with a holding relay, and wherein the stop switch is configured to energize and deenergize the circuit via the holding relay; wherein the stop switch is configured to: transmit a first signal to the holding relay to deenergize the circuit upon detecting, with the motion sensor, that the person is located within the first architectural location; and transmit a second signal to the holding relay to energize the circuit upon detecting, via the motion sensor, that the person has left the first architectural location.

In addition to one or more of the above disclosed features, or as an alternate, wherein: the stop switch includes: a plunger; and an actuator configured to move the plunger upon the stop switch detecting, via the motion sensor, that the person is in the first architectural location.

In addition to one or more of the above disclosed features, or as an alternate, the plunger is a pull cap.

In addition to one or more of the above disclosed features, or as an alternate, the stop switch includes a housing and the stop switch is configured to: move the pull cap away from the housing by the actuator when the stop switch detects, via the motion sensor, that the person is in the first architectural location.

In addition to one or more of the above disclosed features, or as an alternate, the stop switch is configured to: transmit a second signal to the holding relay to energize the circuit upon detecting manual retraction of the pull cap.

In addition to one or more of the above disclosed features, or as an alternate, the elevator system includes: an elevator controller operationally connected to the circuit and configured to: stop an elevator car or prevent the elevator car from traveling to the first architectural location upon detecting that the circuit is deenergized; and run the elevator car upon detecting that the circuit is energized.

In addition to one or more of the above disclosed features, or as an alternate, the elevator system includes: a hoistway, wherein: the elevator controller is in a controller room of the hoistway; the first architectural location is a hoistway pit of the hoistway; and the elevator car is positioned to move within the hoistway.

Further disclosed is an elevator system, having: a mobile device that includes: a communication module configured to communicate over a wireless network with a holding relay of the elevator system, the holding relay configured to energize and deenergize a circuit; a geo-tracking module configured to track a location of the mobile device; wherein the mobile device is configured to transmit a first signal to the holding relay to deenergize the circuit.

In addition to one or more of the above disclosed features, or as an alternate, the mobile device transmits the first signal upon the mobile device detecting that it is in or near a first architectural location.

In addition to one or more of the above disclosed features, or as an alternate, the mobile device continuously transmits the first signal.

In addition to one or more of the above disclosed features, or as an alternate, the mobile device is further configured to: transmit a second signal to the holding relay to energize the circuit upon the mobile device detecting that it has left the first architectural location.

BRIEF DESCRIPTION OF THE DRAWINGS

The following descriptions should not be considered limiting in any way. With reference to the accompanying drawings, like elements are numbered alike:

FIG. 1 is a schematic illustration of an elevator system that may employ various embodiments of the present disclosure;

FIG. 2 shows a stop switch of the elevator system according to a disclosed embodiment;

FIG. 3 shows a mobile device that communicates with the elevator system according to an embodiment;

FIG. 5 is a flowchart showing another method of operating the elevator system according to an embodiment.

DETAILED DESCRIPTION

Figure 4:
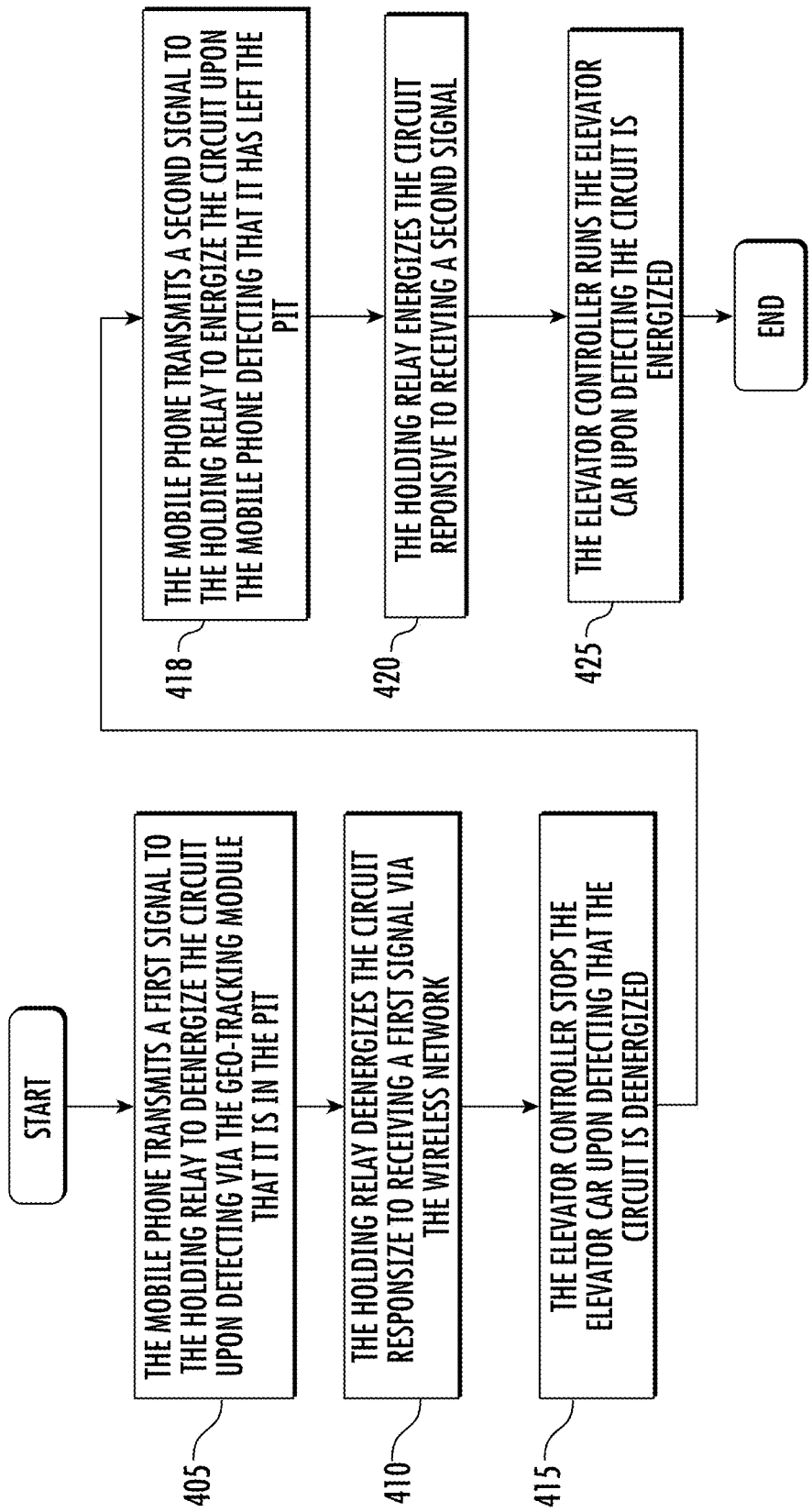
FIG. 4 is a flowchart showing a method of operating the elevator system according to an embodiment.

A detailed description of one or more embodiments of the disclosed apparatus and method are presented herein by way of exemplification and not limitation with reference to the Figures.

FIG. 1 is a perspective view of an elevator system 101 including an elevator car 103, a counterweight 105, a tension member 107, a guide rail 109, a machine 111, a position reference system 113, and an elevator controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 (or hoistway) and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The elevator controller 115 is located, as shown, in a controller room 121 of the elevator shaft 117 and is configured to control the operation of the elevator system 101, and particularly the elevator car 103. For example, the elevator controller 115 may provide drive signals to the machine 111 to control the acceleration, deceleration, leveling, stopping, etc. of the elevator car 103. The elevator controller 115 may also be configured to receive position signals from the position reference system 113 or any other desired position reference device. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Remaining with FIG. 1, a hoistway pit (pit) 200 (also referred to as a first architectural location) is illustrated. A person 210 such as a field technician may need to enter the hoistway pit (pit) 200, e.g., to perform maintenance. A stop switch 220 may be positioned within the pit 200. The stop switch 220 may be electronically connected with the elevator controller 115 in the controller room 121 by a circuit 230 (shown schematically) having a holding relay 2310 which keeps the circuit 230 energized. The circuit 230 may be wired through the elevator shaft 117, e.g., along the guide rail 109.

The stop switch 220 may include a housing 2205. A pull cap 2210 may extend forwardly from the housing 2205. The pull cap 2210 may be, e.g. a mushroom style pull cap (plunger). When the pull cap 2210 is pulled away from the housing 2205, e.g., by the person 210, the stop switch 220 is in a stop configuration. This may disrupt power to the holding relay 2310, which may deenergize the circuit 230. Upon sensing the power loss in the circuit 230, the elevator controller 115 may stop the elevator car 103. When the pull cap 2210 is retracted, i.e., pushed back toward the housing 2205, the stop switch 220 is in a run configuration, or vice versa. Upon entering the run configuration, the holding relay 2310 may be energized, which may energize the circuit 230. Upon sensing power in the circuit 230, the elevator controller 115 may run the elevator car 103.

According to an embodiment, the stop switch 220 may include a motion sensor 2215 that may be integrated into the housing 2205. A switch controller 2220 of the stop switch 220 may be in electronic communication with the motion sensor 2215. According to an embodiment upon sensing the person 210 in the pit 200, the stop switch 220 may send a first signal to the holding relay 2310, via a holding relay controller 2325, to deenergize the circuit 230. As indicated above, this may result in the elevator controller 115 sensing the power loss in the circuit 230 and stopping the elevator car 103. Once the person 210 (or other moving object) is no longer detected by the stop switch 220 the stop switch 220 may send a second signal to the holding relay 2310 to energize the circuit 230. As indicated above, this may result in the elevator controller 115 sensing the restored power in the circuit 230 and running the elevator car 103.

Another embodiment of the stop switch 220 is illustrated in FIG. 2. FIG. 2 illustrates the housing 2205, the pull cap 2210 and the motion sensor 2215 of the stop switch 220. The stop switch 220 may further include an actuator 2225, illustrated schematically. The actuator 2225 may be a solenoid or other implement that is controlled, e.g., by the switch controller 2220. Upon the stop switch 220 sensing the person 210 in the pit 200, the actuator 2225 is controlled to push out the pull cap 2210. This action places the stop switch 220 in the stop configuration, or vice versa. As indicated, when the stop switch 220 is in the stop configuration, power may be disrupted to the holding relay 2310, the circuit 230 may be deenergized, and the elevator controller 115 may stop the elevator car 103. Manually retracting (pushing back) the pull cap 2210 toward the housing 2205, the stop switch 220 is again in the run configuration. Upon entering the run configuration, the holding relay 2310 may be energized, which may energize the circuit 230. Upon sensing power in the circuit 230, the elevator controller 115 may run the elevator car 103.

In a further embodiment, the person 210 has a mobile device (mobile phone) 240. As illustrated in FIG. 3, the mobile phone 240 has a communication module 2410 and a geo-tracking module 2420, e.g., to track a specific location of the mobile phone 240. The mobile phone 240 and the holding relay 2310 are both configured to communicate over a wireless network 250, which may be a Bluetooth or other personal area network or similar low energy and rapid pairing network.

When the mobile phone 240 determines that the person 210 is in the pit 200, the mobile phone 240 may transmit a third signal to the holding relay 2310. The third signal may be the same as the first signal, instructing the holding relay 2310 to deenergize the circuit 230. As indicated above, this may result in the elevator controller 115 sensing the power loss in the circuit 230 and stopping the elevator car 103. Alternatively, rather than transmitting a third signal only upon determining the person 210 is in the pit 200, the signal is always transmitted by the mobile phone 240, e.g., so that the holding relay 2310 receives the signal whenever the mobile phone 240 is in close proximity to the pit 200. For example, the communications may be calibrated so that the signal is received when the mobile phone 240 is in or near the pit 200.

Once the mobile phone 240 detects that the person 210 is no longer in the pit 200, the mobile phone 240 may send a fourth signal to the holding relay 2310, or may send no additional signal. The fourth signal may be the same as the second signal, instructing the holding relay 2310 to energize the circuit 230. Or the holding relay 2310 may energize the circuit 230 after detecting no additional signal for a predetermined period of time. As indicated above, this may result in the elevator controller 115 sensing the restored power in the circuit 230 and running the elevator car 103.

With the above configurations, human error of forgetting to engage the stop switch is removed.

Turning to FIG. 4, a flowchart shows a method of operating the elevator system 101 according to an embodiment. As shown in block 405 the method includes the mobile phone 240 transmitting the first signal to the holding relay 2310 to deenergize the circuit 230 upon the mobile phone 240 detecting via the geo-tracking module that it is in the pit 200, or when the mobile phone 240 is close enough to the holding relay 2310 such that the first signal is received.

As shown in block 410 the method includes the holding relay 2310 deenergizing the circuit 230 responsive to receiving a first signal via the wireless network 250. As shown in block 415 the method includes the elevator controller 115 stopping an elevator car 103 upon detecting that the circuit 230 is deenergized. In one embodiment, instead of stopping the elevator car 101, the elevator car 101 is controlled such that it remains a predefined distance of the pit 200, e.g., where the distance is measured in feet or levels.

As shown in block 418 the method includes the mobile phone 240 transmitting the second signal to the holding relay 2310 to energize the circuit 230 upon the mobile phone 240 detecting that it has left the pit 200. As shown in block 420 the method includes the holding relay 2310 energizing the circuit 230 responsive to receiving the second signal. As shown in block 425 the method includes the elevator controller 115 running the elevator car 103 upon detecting that the circuit 230 is energized.

Turning to FIG. 5, a further flowchart shows a method of operating the elevator system 101 according to another embodiment. As shown in block 510, in one embodiment the method may include the stop switch 220 detecting, via the motion sensor 2215, that a person 210 (or another moving object) is located in the pit 200. As shown in block 520 the method may include the stop switch 220 transmitting a first signal to the holding relay 2310 to deenergize the circuit 230 upon detecting that the person 210 is in the pit 200. In certain embodiments, as shown in block 520, the method may further include actuating the plunger (e.g., biasing the pull cap 2210 away from the housing 2205 by the actuator 2225) when the stop switch 220 detects the person 210 in the pit 200. However, within the scope of the disclosure are embodiments in which the stop switch 220 transmits the first signal to the hold relay 2310 without requiring the pull cap 2210 to be physically moved to an actuated position, e.g., away from the housing 2205.

As shown in block 530 the method includes the holding relay 2310 deenergizing the circuit 230 responsive to receiving the first signal from the stop switch 220. As shown in block 535 the method includes the elevator controller 115 stopping an elevator car 103 or preventing the elevator car 103 from traveling to the pit 200 upon detecting that the circuit 230 is deenergized.

As shown in block 540, in one embodiment the method may also include the stop switch 220 transmitting the second signal to the holding relay 2310 to energize the circuit 230 upon detecting, via the motion sensor 2215, that the person 210 has left the pit 200 or upon detecting manual retraction of the pull cap 2210. As further shown in block 540, the method alternatively includes the stop switch 220 transmitting the second signal to the holding relay 2310 to energize the circuit upon detecting manual retraction of the plunger (pull cap 2210).

As shown in block 545 the method includes the holding relay 2310 energizing the circuit 230 responsive to receiving the second signal. As shown in block 550 the method includes the elevator controller 115 running the elevator car 103 upon detecting that the circuit 230 is energized.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:
a hoistway having a pit;
an elevator car configured to move in the hoistway;
an elevator car controller that controls the elevator car;
a circuit operationally coupled to the car controller, wherein the controller is configured to stop the elevator car upon sensing a power loss in the circuit;
a holding relay configured to energize and deenergize the circuit;
a mobile phone that is configured to determine when it is in or near the hoistway pit;
wherein the holding relay configured to:
pair with the mobile phone over a wireless network;
receive a first signal from the mobile phone, after pairing, with instructions to de-energize the circuit when the mobile device determines that it is in or near the hoistway pit; and
deenergize the circuit responsive to receiving the first signal via the wireless network from the mobile phone.

2. The elevator system of claim 1, wherein the holding relay is further configured to energize the circuit responsive to receiving a second signal from the mobile phone with instructions to energize the circuit when the mobile phone determines that it has left the hoistway pit.

3. The elevator system of claim 1, wherein the elevator car controller is configured to run the elevator car upon detecting that the circuit is energized.

4. The elevator system of claim 1, wherein the elevator controller is in a controller room of the hoistway.

* * * * *